United States Patent [19]

Rustand

[11] 4,273,235
[45] Jun. 16, 1981

[54] DEVICE FOR SELECTIVE FEED OUT OF ARTICLES

[75] Inventor: Willy Rustand, Asker, Norway

[73] Assignee: Tomra Systems A/S, Asker, Norway

[21] Appl. No.: 25,809

[22] Filed: Apr. 2, 1979

[30] Foreign Application Priority Data

Apr. 7, 1978 [NO] Norway ................................ 781233

[51] Int. Cl.³ ...................... B65G 65/04; B65G 43/00; B65G 33/06
[52] U.S. Cl. .................................. 198/372; 198/437; 198/624; 198/722
[58] Field of Search ............... 198/370, 372, 436, 437, 198/624, 722, 611, 612, 492, 491, 600; 209/523–527, 925; 221/260

[56] References Cited

U.S. PATENT DOCUMENTS

| | | | |
|---|---|---|---|
| 1,312,525 | 8/1919 | Brul | 198/600 |
| 2,829,757 | 4/1958 | Breeback | 198/612 |
| 3,270,881 | 9/1966 | Calhoun | 209/524 |
| 3,272,309 | 9/1966 | Reading | 198/611 |
| 4,044,891 | 8/1977 | Pynsky | 198/491 |

FOREIGN PATENT DOCUMENTS 2535285 2/1976 Fed. Rep. of Germany ........... 198/372

Primary Examiner—Robert B. Reeves
Assistant Examiner—B. Bond
Attorney, Agent, or Firm—A. C. Nolte, Jr.; Edward B. Hunter

[57] ABSTRACT

An assembly in the nature of a plurality of associated conveyors for selectively transferring a supply of articles for example, bottles, from one station to another. A pair of coacting and spaced rollers are constructed and arranged in the assembly to transfer the articles one by one from one of the conveyors to another; the arrangement being such that each article is temporarily retained or detained between the rollers and out of contact with the first conveyor enroute to the second conveyor.

6 Claims, 5 Drawing Figures

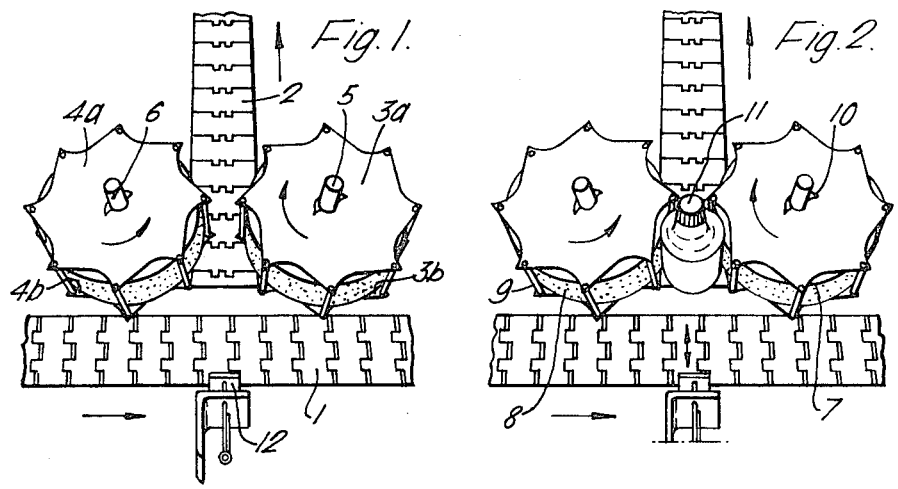
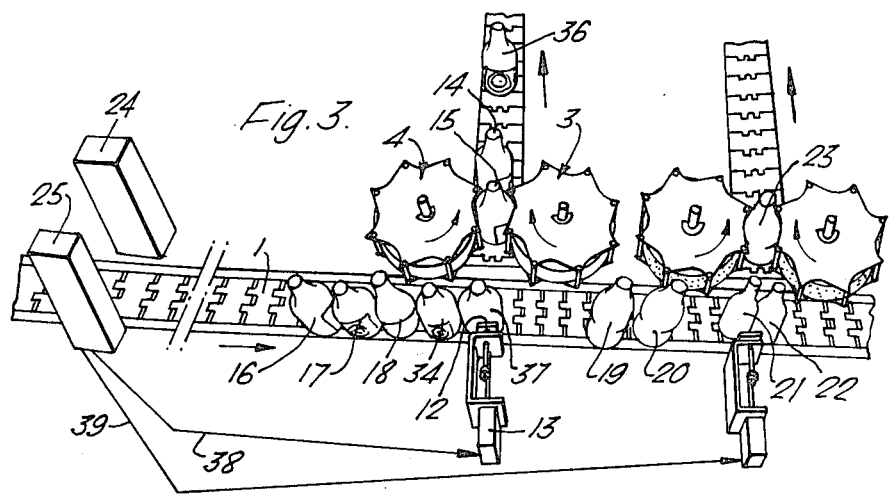
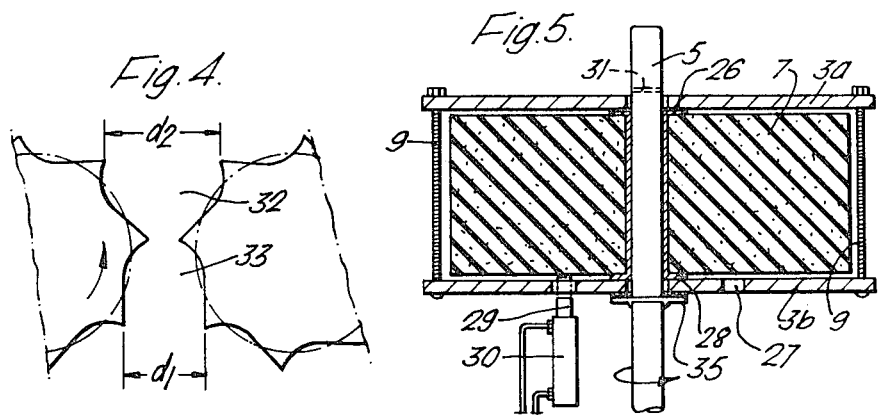

DEVICE FOR SELECTIVE FEED OUT OF ARTICLES

The present invention relates to a device for selective feed out of articles from a first conveying track to one or a multiple of branched second conveying tracks, said device including a means operating transversely of said first conveying track for selective removal of a specific article from the first conveying track and means for receiving said removed article and feeding the article to said second conveying track.

Devices for sorting articles where the articles after an appropriate identification may be selectively guided from one conveying track to two or a multiple of branched conveying gates by means of selective control of feed out gates are known. Such feed out gates are inter alia known from U.S. Pat. No. 3,144,926, where selectively controllable curved deviation means cause the article to be brought from one conveying track on to a branched conveyor. The said deviation means will in the activated position extend at an angle across the main conveying track substantially over its complete width. If a first article on the conveying track is to be removed at a first branch, whereas the next article is to be removed at a second subsequent branch, the said deviation means must return to neutral position so that said second article may pass said deviation means and by means of a second subsequent deviation means be gated on to said second branch.

The present invention therefore is intended to avoid such deviation means which in one position block the main conveying track. According to the present invention there is no need for a preceding synchronization of gates before the detection of articles. Nor is there any need according to the present invention to provide a certain distance between the articles before the feed out thereof. It is also an object of the present invention to provide a device which has a reduced noise level, compared with the known devices, since it is an object of the invention to avoid contact of the articles with each other during the feed out.

The applicant's Norwegian Pat. No. 136,884 (U.S. Pat. No. 3,960,261 or British Pat. No. 1,443,610) discloses a device for conveying bottles of different size, shape and weight and feed out thereof. The bottles are conveyed along a first conveying track, are retarded by a retarding means and thereafter are dropped substantially freely from said retarding means on to a second conveying means in the form of a rotary disc or conveyor. Each bottle is fed out from said second conveying means by means of a pair of rollers made from a resilient material. An auxiliary optional pushing means is provided for removing the bottle quickly from the first conveying track and towards the said pair of rollers. The prior art device is in particular suitable for conveying such objects from a vertical track to a horizontal track. It is however, required that a certain spacing between each bottle be provided to avoid the bottles colliding particularly along the first conveying track. No means are however, provided for branching the bottles off to any of a multiple of second branched tracks.

U.S. Pat. No. 1,937,303 concerns a conveyor system comprising a main line with branch lines communicating therewith, where articles on the main line may be selectively delivered to the proper branch line. Each article is provided with a coloured label identifying the article, each branch line being assigned a corresponding colour. The means for bringing an article from the main line on to a branch line are in a first embodiment constituted by arms mounted on a pair of chains moving transversely across the main line. In a second embodiment there are provided pushing means for pushing the article off the main line on to an alined branch line. However, when handling such articles as bottles or articles having a large height to width ratio, such articles may easily capsize using this prior art device.

It is thus an object of the present invention to provide a device which overcomes the disadvantages of the prior art devices.

With these and other objects in view, this invention contemplates an assembly in the nature of a plurality of associated conveyors for selectively transferring a supply of articles from one station to another, and comprising at least a pair of spaced coacting rollers constructed and arranged to move the articles, one by one, from one conveyor to another, the arrangement being such that each article is temporarily detained between the rollers and out of contact with the first conveyor enroute to the second conveyor.

Further according to the present invention, the said device is characterized in that said receiving and feed out means include two co-acting units, said units being preferably arranged symmetrically with respect to each other, each unit having a roller of elastic material with a large coefficient of surface friction, e.g. foamed rubber, a plate member arranged at each end face of said roller and having frictional coupling with said roller, and means for fixing said plate members of each unit relative to each other, said roller and said plate members of each unit being rotatable about a common axis, the direction of rotation of one of said units being the opposite of the other unit, and means for retaining said article by said units for a predetermined delay period of time.

According to further features of the device according to the invention, the said receiving and feed out means may comprise a controllable locking pin which during said delay period of time may be brought in engagement with a corresponding element, e.g. a locking hole, in one of said plate members being incorporated in said unit. The said plate members are preferably substantially star shaped. The outermost portions of said plate members may be extended beyond the outer diameter of said roller. When said two units are in a receiving position, the respective co-acting plate members of each unit will form a substantially U-shaped opening or bay, whereas the opposite opening or bay at the feed out side of said units forms an opening or bay having a substantially onion-shaped cross-section.

The invention will now be further described with reference to the accompanying drawing showing by way of example a preferred embodiment thereof. In the description hereinafter the invention is described in connection with articles such as bottles and liquid containers. It will however, be readily understood that the invention in no way is limited to such articles.

FIG. 1 shows a preferred embodiment of the device according to the invention in top perspective view.

FIG. 2 illustrates the embodiment of FIG. 1, where a bottle is located in a receiving position and is ready for feed out.

FIG. 3 shows a device according to the invention used in a feed out system.

FIG. 4 is a geometrical consideration of a section of the receiving and feed out device according to the invention.

FIG. 5 is a cross-section through a part of the receiving and feed out device according to the invention.

In FIG. 1 there is shown a main conveyor 1 and a conveyor 2 branched off from said main conveyor. If a bottle is to be moved from the conveyor 1 to the conveyor 2, a pushing means 12, when the bottle is in alignment therewith, gives the bottle a rapid powerful kick moving the bottle away from the conveyor 1 and into a receiving opening or bay, see the reference numeral 33 in FIG. 4, being formed by a first and second star shaped pairs of plate wheel members 3a, 3b, 4a, 4b. The pushing means need not necessarily have a stroke distance equal to the width of the conveyor 1, but may suitably be less. The bottle 11 in FIG. 2 is retained in position by a pair of rollers 7, 8 rotating in the direction of movement of the bottle, said rollers being made from a porous resilient material, e.g. foamed rubber having a large coefficient of surface friction. As will appear from FIG. 5, the said roller 7 is mechanically linked with a drive shaft 5 moving the said roller in the required direction of rotation. The star-like wheels 3a and 3b, denoting upper and lower star wheel respectively, are connected with the said roller 7 by means of upper 26 and lower 28 frictional couplings, respectively. To ensure that the bottle 11 is given a controlled stable feed out from the conveyor 1 on to the conveyor 2, the star wheel unit 3a, 3b is retained in a locked state for a short duration of time in that a locking hole 27 in the lower star wheel engages a locking pin 29, said pin being controllable by means of a locking-piston cylinder 30. In the locked position the locking pin 29 will thus be in the position in the star wheel shown in dashed lines in FIG. 5. The rollers 7 and 8 will thus cause the bottle 11 to be standing stable that is, motionless for a short period of time before the locking pin 29 moves out of engagement. The star wheels will thereupon turn together with the rollers and cause a smooth feed out by means of said rollers. Connecting members 9 have been provided between the star wheels along selected locations of the outer circumference of said star wheels. Said members 9 may e.g. be a long bolt having provisions for attachment by a nut or other fastener. In FIG. 5 there is also shown a bearing 35 which is mechanically connected to the drive shaft 5 and provides suitable bedding or base support of the unit consisting of the star wheels and the roller. At the top of the drive shaft 5 there may be arranged a groove or hole 31 for a quick-lock 10, see FIG. 2, so that the unit may be made higher or lower dependent on the size of bottles which are to be received and fed out. The section shown in FIG. 5 as appendant to shaft 5 applies also for the unit consisting of the roller 8 and pair of star wheels 4a, 4b in connection with a drive shaft 6.

In FIG. 4 there is shown a geometrical consideration of the star wheels. The receiving opening or bay 33 has in a preferred embodiment a substantially U-shaped form, the two free branches of the U being substantially parallel when a bottle is fed into said opening or bay. The feed out portion 32 will then have an approximate onion-shaped form. In FIG. 4 the star wheels are in the short temporary locking position. The receiving opening or bay has then a width d1, whereas the feed out opening or bay has a free width d2, d1 being less than d2.

It will immediately be understood that other embodiments of the said wheels or plate members 3 and 4 may be provided as required.

In a practical embodiment of the invention the device is included in a sorting system, as schematically shown in FIG. 3. The bottles are fed on the conveyor 1 past a detecting station 24, 25, e.g. consisting of a light emitter 24, and an optical detector 25. Thus, the said detecting station may detect the outer shape and particular characteristics, as e.g. the colour, of the bottles. In the example of FIG. 3 the bottles 36, 14, 15, 16, 17, 34 and 37 may be of the type I. The bottles 18, 19, 20 and 23 may be of the type II, whereas the bottles 21 and 22 may be of the type III.

Thus, bottles of type I will be fed out at the first feed out device, whereas bottles of the type II, as shown, will be fed out at the second feed out device, e.g. the rightmost in FIG. 3. The bottles of the type III will be fed further to a possible additional feed out device (not shown). Since the bottles just mentioned at first were fed in a row on the conveyor 1, the bottles 15 and 14 were present between the bottles 37 and 19, respectively, and the bottle 36 was present between the bottles 20 and 21, respectively, whereas the bottle 23 was in front of the bottle 22. As shown in FIG. 3, the bottle 15 is in a position to be fed out from the pair of units 3, 4, each pair consisting of said pair of star wheels and roller. The bottle 37 is in a position immediately prior to that instant when it will be subjected to a short kick by the pushing means 12 and end in a position as shown in FIG. 2. The pushing means will preferably be pneumatical and controlled by a pneumatically operating unit, schematically shown by the reference numeral 13. The pushing means may alternatively be electrically controlled by an electric operating unit 13. The detecting station 24, 25 will synchronize the pushing action of the bottles at the respective pushing locations and the thus timed pushing operations are controlled through control lines 38 and 39 in that the unit 13 is e.g. connected with the optical detector 25. It is thus an important feature of the present invention that it is the electronics associated with the detecting station which synchronize the pushing operations of the respective bottles and not that the bottles synchronize the pushing out operation. The synchronization is made in such a manner that the pushing means 12 makes contact with the bottle substantially at right angles to its circumference, i.e. on its midpoint. Thereby it is ensured that the bottles are not given any rotational movement when being fed into the receiving opening or bay 33.

As previously mentioned the unit consisting of the two pairs of star wheels 3, 4 are retained in a locked state by means of the locking pin 29 for a short duration of time, which delay ensures that the bottle temporarily remains standing and still in an upright position. The said delay will at maximum be equal to the conveying length of the conveyor 1 corresponding to a width of a bottle. Preferably, the delay will be somewhat less.

With the device thus shown, the bottles being fed out on to the conveyor 2 will arrive with only a small distance between each. The distance of the conveyor 2 is preferably approximately equal to the peripheral speed of the rollers 7, 8.

According to the invention, the velocity of the conveyor 2 is greater than the velocity of the conveyor 1. Any bottles which are lying on the conveyor or any strange bodies passing the detecting station 24, 25 will not represent elements disturbing the operation of the system, since such foreign matter simply will be carried by the conveyor 1 and be fed out e.g. to a container (not shown) arranged at the end of the conveyor 1.

In order to ensure the required lubrication of the conveyors, pure water is sufficient to keep the conveyors clean. It will also be understood that at the higher operational speeds the importance of the rollers 7, 8 is greater than it is with the lower operational speeds.

I claim:

1. A device for selective feed out of articles from a first conveying track to one or a multiple of branched second conveying tracks, said device including a means operating transversely of said first conveying track for selective removal of a specific article from the first conveying track and means for receiving said removed article and feeding the article to said second conveying track, characterized in that said receiving and feed out means include two co-acting units, said units being preferably arranged symmetrically with respect to each other, each unit having a roller of elastic material with a large coefficient of surface friction, a plate member arranged at each end face of said roller and having frictional coupling with said roller and means for fixing said plate members of each unit relative to each other, and that said roller and said plate members of each unit being rotatable about a common axis, the direction of rotation of one of said units being the opposite of the other, and means for retaining said article by said units for a predetermined delay period of time.

2. A device as claimed in claim 1, further characterized in that said receiving and feed out means include at least one controllable locking pin which during said delay period of time may be brought into engagement with a corresponding element in one of said plate members incorporated in said unit.

3. A device as claimed in claim 1, further characterized in that said plate members have a substantially star shaped form.

4. A device as claimed in claim 1, further characterized in that the outermost portions of said plate members extend beyond the outer diameter of said roller.

5. A device as claimed in claim 1, further characterized in that when the said two units are in receiving position, the said co-acting plate members of each unit together form a substantially U-shaped opening or bay, whereas the opposite opening or bay at the feed out side of said units is approximately onion-shaped in cross-section.

6. An assembly in the nature of a plurality of associated conveyors for selectively transferring a supply of articles from one station to another, and comprising at least a pair of spaced coacting rotary units constructed and arranged to move such articles, one by one, from one conveyor to another, detaining means engaging said rotary units such that each article is temporarily detained between the rotary units and out of contact with the first conveyor and the second conveyor while enroute to the second conveyor, and drive means to rotate the rotary units from a detaining mode to a transfer mode.

* * * * *